United States Patent
Pietsch

(10) Patent No.: US 9,346,188 B2
(45) Date of Patent: May 24, 2016

(54) APPARATUS AND METHOD FOR SIMULTANEOUSLY SLICING A MULTIPLICITY OF SLICES FROM A WORKPIECE

(71) Applicant: Siltronic AG, Munich (DE)

(72) Inventor: Georg Pietsch, Burghausen (DE)

(73) Assignee: SILTRONIC AG, Munich (DE)

( * ) Notice: Subject to any disclaimer, the term of this patent is extended or adjusted under 35 U.S.C. 154(b) by 272 days.

(21) Appl. No.: 13/749,804

(22) Filed: Jan. 25, 2013

(65) Prior Publication Data
US 2013/0206126 A1 Aug. 15, 2013

(30) Foreign Application Priority Data
Feb. 9, 2012 (DE) .......................... 10 2012 201 938

(51) Int. Cl.
*B28D 5/04* (2006.01)
*B28D 5/00* (2006.01)

(52) U.S. Cl.
CPC ................ *B28D 5/045* (2013.01); *B28D 5/007* (2013.01); *B28D 5/0076* (2013.01)

(58) Field of Classification Search
CPC ... B24B 27/0633; B28D 5/045; B28D 5/0076
USPC ........ 125/21, 16.02; 451/296, 449, 450, 53, 7
See application file for complete search history.

(56) References Cited

U.S. PATENT DOCUMENTS

| | | | |
|---|---|---|---|
| 5,269,285 A * | 12/1993 | Toyama et al. | 125/16.01 |
| 6,065,461 A | 5/2000 | Asakawa et al. | |
| 6,067,976 A | 5/2000 | Katayama et al. | |
| 6,652,356 B1 * | 11/2003 | Ariga | 451/7 |
| 6,773,333 B2 * | 8/2004 | Lundt et al. | 451/7 |
| 7,959,491 B2 | 6/2011 | Kitagawa | |
| 7,988,530 B2 * | 8/2011 | Oishi et al. | 451/7 |
| 8,690,636 B2 * | 4/2014 | Oshima | 451/7 |
| 2004/0084042 A1 | 5/2004 | McAulay et al. | |
| 2010/0252017 A1 | 10/2010 | Kitagawa et al. | |

FOREIGN PATENT DOCUMENTS

| | | |
|---|---|---|
| CN | 101861230 A | 10/2010 |
| DE | 10122628 A1 | 11/2002 |
| EP | 0798091 A2 | 10/1997 |
| EP | 1020271 A1 | 7/2000 |
| JP | 10180750 A | 7/1998 |
| JP | 10249700 A | 9/1998 |

(Continued)

*Primary Examiner* — Robert Rose
(74) *Attorney, Agent, or Firm* — Leydig, Voit & Mayer, Ltd.

(57) ABSTRACT

A method and apparatus are used to simultaneously slice a multiplicity of slices from a workpiece. The workpiece is held with a feed device so as to position an axis of the workpiece parallel to axes of wire guide rolls of a wire saw and is moved from above through a web of the wire saw. A slurry is supplied as abrasive to wire sections of the web while the wire sections are moved relative to the workpiece. The relative movement guides the wire sections from an entry side to an exit side through the workpiece. A coolant is sprayed from the side and below through nozzles into slicing gaps in the workpiece. The nozzles are arranged below the web parallel to the axes of the wire guide rolls. The coolant is sprayed into the slicing gaps through a nozzle situated opposite the entry side of the respective wire section.

13 Claims, 3 Drawing Sheets

(56) References Cited

FOREIGN PATENT DOCUMENTS

| JP | 2001328054 A | 11/2001 |
|----|--------------|---------|
| JP | 2004017222 A | 1/2004 |
| JP | 200442241 A | 12/2004 |
| JP | 2006159360 A | 6/2006 |
| JP | 2012152830 A | 8/2012 |
| JP | 2012187646 A | 10/2012 |
| JP | 2012218090 A | 11/2012 |
| KR | 100207810 B1 | 7/1999 |

* cited by examiner

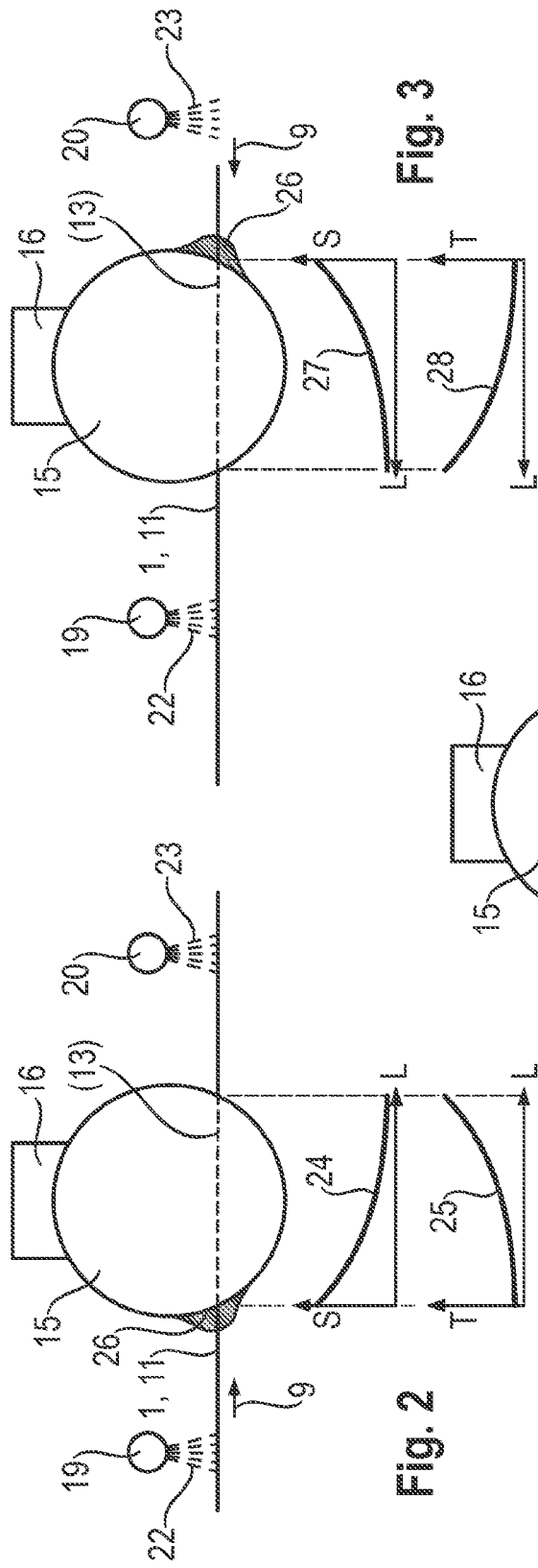
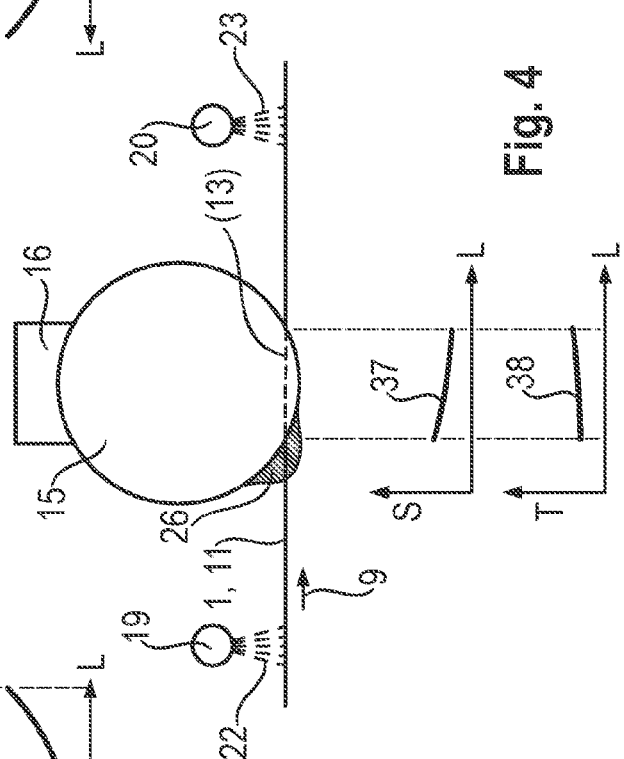

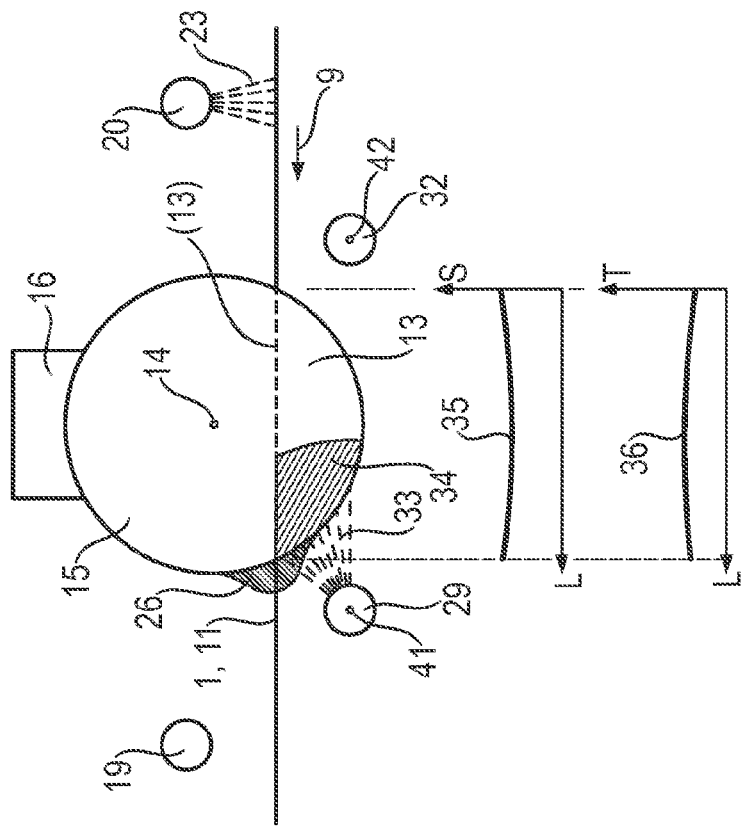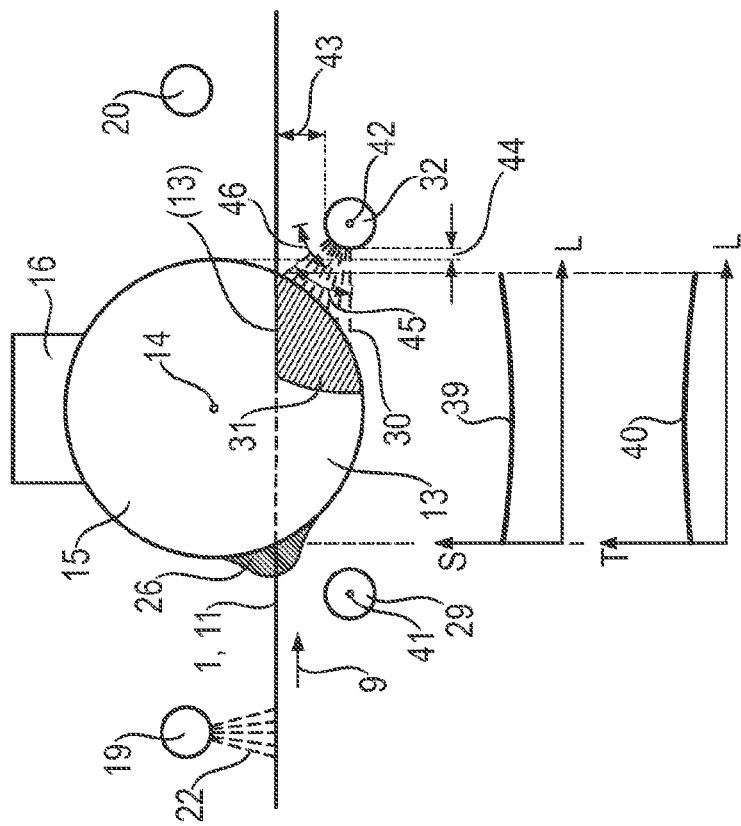

APPARATUS AND METHOD FOR SIMULTANEOUSLY SLICING A MULTIPLICITY OF SLICES FROM A WORKPIECE

CROSS REFERENCE TO RELATED APPLICATIONS

This application claims priority to German Patent Application No. DE 10 2012 201 938.3, filed Feb. 9, 2012, which is hereby incorporated by reference herein in its entirety.

FIELD

The present invention relates to an apparatus and a method for slicing a multiplicity of slices from a workpiece, in particular of semiconductor wafers from a crystal, by means of a wire slicing lapping method with alternating wire running direction.

BACKGROUND

Semiconductor wafers are slices composed of semiconductor materials such as, for example, elemental semiconductors (silicon, germanium), compound semiconductors (for example composed of an element of the third main group of the periodic system such as aluminum, gallium or indium and an element of the fifth main group of the periodic system such as nitrogen, phosphorus or arsenic) or compounds thereof (for example $Si_{1-x}Ge_x$, $0<x<1$). They are required, in particular, as basic material for electronic components and have to meet stringent requirements with regard to flatness, cleanness and lack of defects.

Flat slices composed of other materials are required for other applications, for example glass slices as substrates for producing magnetic memory disks or slices composed of sapphire as a support for manufacturing optoelectronic components.

Such slices composed of semiconductor material or some other material are sliced from a rod consisting of the respective material. In particular, a chip-removing machining method such as slicing lapping is appropriate for slicing the slices. Chip removal or chipping is understood to mean, according to DIN 8580, mechanical machining methods in which material is brought to the desired form by removing excess material in the form of chips. In this case, the term chip denotes a particle detached from the workpiece.

According to DIN 8589, lapping is chipping using loose grain distributed in a liquid or paste (lapping slurry) as abrasive, which is guided on a normally shape-bearing counterpiece (lapping tool) with the cutting paths of the individual grains being as far as possible non-directional. The material removal is effected by brittle-erosive separation of the material cohesion via the formation of micro cracks at the penetration location of the lapping grain and spalling of small material particles. Lapping is based on a three-body interaction between workpiece, lapping grain and lapping tool. Lapping is characterized by the fact that the tool carrier (lapping disk, lapping wire) does not contain hard substances which come into engagement with the material in chipping fashion.

Grains composed of diamond, silicon carbide, boron carbide, boron nitride, silicon nitride, zirconium oxide, silicon dioxide, aluminum oxide, chromium oxide, titanium nitride, tungsten carbide, titanium carbide, vanadium carbide and many others, and also mixtures thereof, are used as loose lapping substances supplied during slicing lapping.

Diamond, silicon carbide and aluminum oxide, in particular silicon carbide, are important as lapping substances when slicing semiconductor wafers.

In the case of single slicing lapping, exactly one slice is sliced from the workpiece per cut; in the case of multiple slicing lapping, a multiplicity of slices are sliced simultaneously per cut. Multiple slicing lapping can be carried out using a wire which is multiply diverted via rolls, such that it comes multiply into engagement with the workpiece. This is then referred to as single-wire multiple slicing lapping. Alternatively, methods are known in which a multiplicity of individual wires, which are fixedly braced in a frame like strings of a harp, work through the workpiece. This is then correspondingly referred to as multi-wire multiple slicing lapping. The present invention relates generally to the slicing of a multiplicity of slices from arbitrarily shaped workpieces composed of arbitrary materials which can be machined in chipping fashion. The invention relates particularly to the slicing of a multiplicity of slices from prismatically shaped workpieces having rectangular, hexagonal or octagonal base surfaces or of cylinders composed of glass, sapphire or semiconductor material. Single-wire multiple slicing lapping is described more thoroughly below. This is also referred to in shortened designation as slurry wire sawing (SWMS "slurry multi-wire slicing").

An apparatus for single-wire multiple slicing lapping ("slurry wire saw") comprises as essential apparatus features wire, at least two wire guide rolls arranged horizontally and parallel with respect to one another, a take-off and a take-up spool, an apparatus for pre-tensioning a wire in the wire longitudinal direction, a feed apparatus, by means of which the workpiece can be fed perpendicularly to the axes of the wire guide rolls toward the plane spanned by the axes, and an apparatus for applying an abrasive in the form of a slurry of loose hard substances in a carrier liquid. The wire guide rolls are cylindrical and mounted rotatably about their longitudinal axes. Their lateral surfaces have a multiplicity of grooves running concentrically about the axis and largely equidistantly with respect to one another.

In the case of slurry wire sawing, the wire is guided under tension by means of the grooves spirally multiply via the wire guide rolls such that individual wire sections become situated in parallel fashion and form a web. By rotating the wire guide rolls in the same sense, the wire is unwound from the take-off spool and wound onto the take-up spool. In this case, the wire sections of the web respectively move parallel to one another in the wire longitudinal direction. In order to simplify the explanation, the workpiece is assumed hereinafter to be a cylindrical rod composed of semiconductor material (semiconductor rod). Said semiconductor rod is adhesively bonded at its lateral surface to an axially running strip composed of a sacrificial material (sawing strip), for example composed of glass or graphite, and is clamped by means of the latter and with its workpiece axis parallel to the axes of the wire guide rolls in the feed apparatus.

By slowly feeding the rod parallel to the perpendicular of the sawing web toward the web, the workpiece comes into contact with the web by that section of its lateral surface which is situated opposite the sawing strip, and a force builds up in the wire transverse direction between tool (web) and workpiece. As a result of the relative movement between workpiece and web on account of the sawing wire moved through the apparatus, material removal is effected under pressure and with addition of the abrasive. By maintaining the wire transverse tension by means of further continuous feeding of the rod, the wire web works through the entire cross section of the workpiece, and a multiplicity of slices are obtained simultaneously.

Single-wire multiple slicing lapping can be effected with a direction of movement of the wire sections of the web that is constant over the entire cut, or with reversal of the direction of movement. In this case, cutting with continual reversal of the wire direction is of particular importance since specific disadvantages for the achieved flatness and front/rear side parallelism of the slices obtained are avoided by the reversal of direction. Asymmetries between the entry side of the wire sections and the exit side of the wire sections can be averaged out by the reversal of direction and thus are partly compensated for, and the wire consumption can be reduced by the reversal of direction.

The reversal of direction of the wire run corresponding to the pilgrim step method ("pilgrim step motion", "wire reciprocation") comprises a first movement of the wire in a first wire longitudinal direction by a first length and a second movement of the wire in a second direction, which is exactly opposite to the first direction, by a second length, wherein the second length is chosen to be less than the first length. For each pilgrim step, overall a wire length corresponding to the sum of both lengths thereby runs through the workpiece, while the wire section which comes into cutting engagement with the workpiece in this case moves further only by a magnitude corresponding to the difference between the two lengths from the take-off toward the take-up spool. In the pilgrim step method, therefore, the wire is utilized multiply in a ratio of the sum to the difference of the two lengths.

After working through the entire cross section of the workpiece, the wire web reaches the sawing strip adhesively bonded onto the workpiece. The further feed is stopped and the now multiply severed workpiece is withdrawn again from the sawing web by reversal of the feed direction. The workpiece has now been separated into a multiplicity of slices which adhere by part of their circumference to the half-severed sawing strip equidistantly and parallel to one another and perpendicular to the workpiece axis. By chemical, thermal or mechanical release of the adhesive bond, the slices are separated and supplied to a further application-dependent subsequent processing.

The slurry wire sawing and an apparatus suitable for slicing semiconductor wafers are described for example in EP 0 798 091 A2.

The flatness of the sliced slices that can be achieved by wire slicing lapping is impaired by a multiplicity of effects. These include effects related to the kinematics of the wire, the supply and distribution of the abrasive in the sawing gap, the wear of the wire and the sawing grain. Thermal processes have a particularly great influence on the cutting result. It is known from DE 101 22 628 that chipping work and friction processes bring about a heat input into the workpiece that leads to an axial relative movement between the workpiece and the wire sections. In a cylindrical workpiece, the length with which the sawing wire is in engagement with the workpiece changes with the cutting progress. The heat input and thus the axial relative movement between the workpiece and the wire sections consequently changes slowly (quasi-statically) with time. When cutting into and when cutting out of the workpiece, abrupt changes in the engagement lengths are present, and the cutting rate that results given a constant wire transverse tension is particularly high. Therefore, a particularly great axial relative displacement between workpiece and web occurs during cutting in and out, with the result that all slices of the sawing cut acquire a flatness deviation curved out of the ideal sawing plane substantially in the same sense and to the same extent. This flatness deviation, referred to as sawing-in and/or -out undulation, is particularly harmful since it has a long wavelength (several centimeters) and in this case impairs the parallelism of the front and rear sides of the slices (thickness homogeneity) only to a small extent. Since the semiconductor wafers exhibit largely elastic behavior in the range of centimeters, (or longer), the sawing-in and/or -out undulation cannot be removed, or can be removed only inadequately, by the material removal accomplished by the subsequent processing steps.

Such undulatory slices are unsuitable for demanding applications. In the case of slicing lapping of large, and particularly in the case of slicing lapping of very large, workpieces into slices, these undesirable thermally governed defects are particularly pronounced. Workpieces having a large diameter are those whose area-equal circle upon projection of a cross section along the principal axis with the smallest moment of inertia has a diameter (equivalent diameter) of greater than or equal to 300 mm; workpieces having a very large diameter are those having an equivalent diameter of greater than or equal to 450 mm.

JP 10180750 describes a method in which the temperature of the abrasive supplied to the sawing gap by spraying from above onto the sawing web is adapted in a closed control loop of temperature regulation of the abrasive and temperature measurement and temporally variable heating is thus counteracted.

DE 101 22 628 B4 describes a method in which the entire part—situated above the wire web—of the lateral surface of the rod is flushed with coolant that is temperature-regulated in a manner dependent on time and cutting progress, and the rod is thus temperature-regulated.

EP 0 798 091 A2 describes methods in which the volumetric flow rate of the abrasive supplied, the viscosity and the feed rate of the rod to the sawing web are altered in a manner dependent on the cutting progress.

Finally, U.S. Pat. No. 7,959,491 B2 describes a method in which the temperature of the slicing lapping agent supplied is increased continuously steadily, but in a manner dependent on the instantaneous position of the web in the rod, over the entire cutting progress from sawing in until sawing out and partial compensation of the thermal effects is thus performed in a manner dependent on the web position in the rod.

The slicing gaps hidden in the rod can be observed if the workpiece is pellucid or transparent at least in a certain spectral range. Thermal observations of the slicing zone on a rod composed of silicon which is transparent in the infrared spectral range showed, by means of a thermal imaging camera, that the heat input into the sawing gap and over the length of the sawing gap is not effected uniformly. In particular, it was observed that the temperature in the slicing gap increases with the engagement length from the wire entry toward the wire exit. The hottest point is reached shortly before wire exit; directly at the surface upon wire exit, the temperature decreases again somewhat, probably via thermal emission and air convection at that surface of the rod which is close to this point. The heating along the wire engagement thus takes place in a very complicated way.

In the slicing gap of a workpiece composed of silicon, a temperature increase of more than 20° C. is observed over the wire engagement length, and just approximately 5° C. in the mass of the surrounding silicon volume that has not yet been cut. The heat gradient over the sawing gap reverses on a short timescale (a few seconds) if the direction of wire movement reverses during slicing lapping preferably carried out in the pilgrim step method. These dynamic temperature fluctuations are considerable, take place for a short period of time with the frequency of the pilgrim step and far exceed the averaged workpiece temperature that varies only slowly over the cutting progress.

The known methods only compensate for this slow quasistatic temperature change. They are unsuitable for compensating for the rapid and much higher temperature changes and the effects thereof, in particular the resulting undulation of the sliced slices.

SUMMARY

In an embodiment, the present invention provides a method for simultaneously slicing a multiplicity of slices from a workpiece, the method comprising: holding the workpiece with a feed device so as to position an axis of the workpiece parallel to axes of wire guide rolls of a wire saw; moving the workpiece, using the feed device, perpendicularly from above through a web of the wire saw, the web being formed from a multiplicity of wire sections running parallel to one another and in one plane; rotating the wire guide rolls while alternately changing the direction of rotation, so that the relative movement guides the wire sections from an entry side to an exit side through the workpiece, the entry side and exit side alternating with the change in direction of rotation; supplying a slurry of hard substances in a carrier liquid as abrasive to the wire sections while the wire sections undergo the relative movement; and spraying a coolant from the side and from below into slicing gaps that arise during the relative movement of the workpiece through the web, wherein the coolant is sprayed through nozzles arranged below the web and parallel to the axes of the wire guide rolls, and wherein the coolant is sprayed into the slicing gaps alternating with the change of direction of rotation only through a nozzle situated opposite the entry side of the respective wire section.

BRIEF DESCRIPTION OF THE DRAWINGS

Exemplary embodiments of the present invention are described in more detail below with reference to the drawings, in which:

FIG. 2 shows the distribution of abrasive and the profile of the temperature over the wire engagement length L in the case of a sawing wire running from left to right, when an apparatus in accordance with FIG. 1 is used.

FIG. 3 shows the distribution of abrasive and the profile of the temperature over the wire engagement length L in the case of a sawing wire running from right to left, when an apparatus in accordance with FIG. 1 is used.

FIG. 4 shows the distribution of abrasive and the profile of the temperature over the wire engagement length L in the case of a sawing wire running from left to right, at the instant when the wire section web cuts into the rod, when an apparatus in accordance with FIG. 1 is used.

FIG. 5 shows the distribution of abrasive and coolant and the profile of the temperature over the wire engagement length L in the case of the sawing wire running from left to right, when abrasive is sprayed from the left onto the web and coolant is sprayed from the right into the sawing gaps by means of a nozzle arranged below the web.

FIG. 6 shows the distribution of abrasive and coolant and the profile of the temperature over the wire engagement length L in the case of the sawing wire running from right to left, when abrasive is sprayed from the right onto the web and coolant is sprayed from the left into the sawing gaps by means of a nozzle arranged below the web.

DETAILED DESCRIPTION

Figure 1:
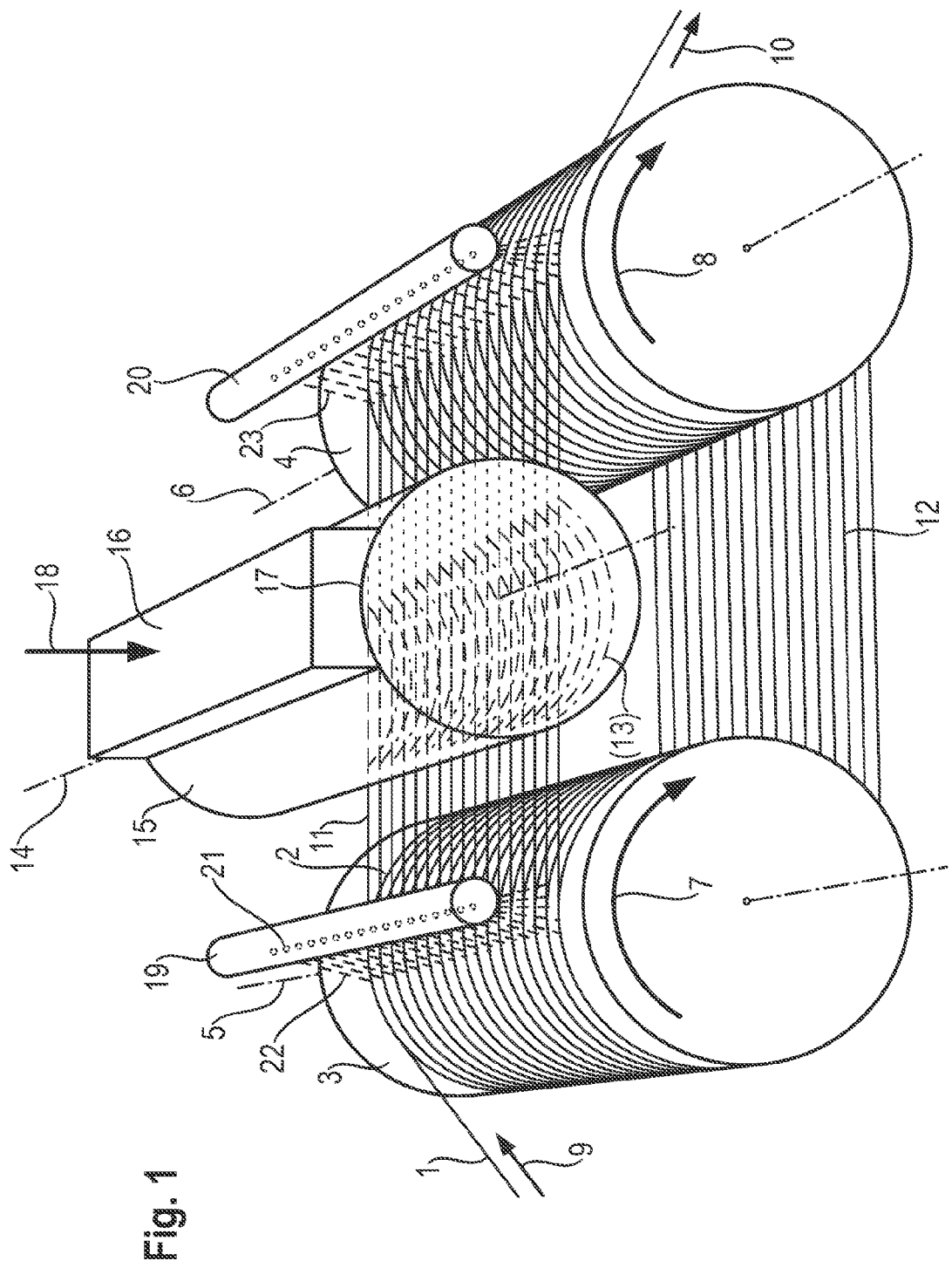
FIG. 1 shows an apparatus for slicing slices from a rod according to the principle of single-wire multiple slicing grinding or single-wire multiple slicing lapping.

An aspect of the present invention is to specify an apparatus and a method for simultaneously slicing a multiplicity of slices from a workpiece with which the rapid and high temperature fluctuations during the slicing lapping of the workpiece are compensated for as much as possible and deviations of the actual cut surface from that of an ideal cutting plane are avoided as much as possible.

The abrasive (slurry) is depleted in the slicing gap over the length of the engagement from wire entry to wire exit on account of displacement, dripping away and consumption and is distributed non-uniformly there. Its concentration and composition change over the length of wire engagement on account of grain wear and grain fracture. In particular, the decreasing quantity of abrasive from wire entry to wire exit leads to a decreasing width of the slicing gap and thus to a thickness of the sliced slices that increases in a wedge-shaped manner in the wire running direction.

Another aspect of the invention is to specify an apparatus and a method which counteract depletion of the abrasive in the sawing gap over the wire engagement length, such that slices having a thickness that increases in the wire running direction do not arise.

In an embodiment, the present invention provides an apparatus for simultaneously slicing a multiplicity of slices from a workpiece, comprising wire, at least two cylindrical wire guide rolls arranged horizontally and parallel with respect to one another and mounted rotatably about their respective axes and having grooves, and a feed device, wherein the wire is guided in the grooves around the wire guide rolls such that a horizontal web composed of a multiplicity of wire sections running parallel to one another and in one plane is present between the wire guide rolls, furthermore comprising first nozzles, which are arranged above the wire guide rolls, for spraying an abrasive onto the wire sections and second nozzles, which are arranged below the web parallel to the axes of the wire guide rolls, for spraying a coolant into slicing gaps of the workpiece from the side and from below.

In another embodiment, the present invention provides a method for simultaneously slicing a multiplicity of slices from a workpiece, comprising holding the workpiece with an axis of the workpiece parallel to axes of wire guide rolls of a wire saw by means of a feed device of the wire saw; moving the workpiece by means of the feed device perpendicularly from above through the web of the wire saw, wherein the web is formed from a multiplicity of wire sections running parallel to one another and in one plane; supplying a slurry of hard substances in a carrier liquid as abrasive to the wire sections while the wire sections describe a relative movement with respect to the workpiece as a result of rotation of the wire guide rolls with a continual change in the direction of rotation, which relative movement guides the wire sections from an entry side to an exit side through the workpiece; spraying a coolant from the side and from below into slicing gaps that arise during the movement of the workpiece through the web, wherein the coolant is sprayed through nozzles into the slicing gaps, which are arranged below the web parallel to the axes of the wire guide rolls, and wherein the coolant is sprayed into the slicing gaps only through the nozzle situated opposite the entry side of the wire sections.

A further slurry of hard substances in a carrier liquid can be used as the coolant.

The abrasive used and the coolant used can have identical properties with the exception of the temperature.

The abrasive used and the coolant used can have the same temperature. The abrasive used and the coolant used can have different temperatures.

The temperature of the coolant can be altered during the movement of the workpiece through the web. The temperature of the coolant can be altered in a manner dependent on the wire engagement length of the wire sections in the workpiece. The temperature of the coolant can be increased as the wire engagement length increases, and reduced as the wire engagement length decreases.

The volumetric flow rate of the coolant sprayed in can be kept constant during the movement of the wire sections through the web. The volumetric flow rate of the coolant sprayed in can be altered during the movement of the wire sections through the web. The volumetric flow rate of the coolant sprayed in can be altered in a manner dependent on the wire engagement length of the wire sections in the workpiece. The volumetric flow rate of the coolant sprayed in can be increased as the wire engagement length increases, and reduced as the wire engagement length decreases.

The temperature and the volumetric flow rate of the coolant can simultaneously be altered according to the abovementioned stipulations.

The method is preferably used for producing semiconductor wafers, particularly preferably for producing semiconductor wafers composed of silicon, which have a diameter that is not less than 300 mm, for example for producing wafers composed of silicon having a diameter of 450 mm.

FIG. 1 shows the elements of an apparatus for single-wire multiple slicing lapping, comprising sawing wire 1, which, wrapped multiply spirally around a left 3 and a right wire guide roll 4, is guided by grooves 2 such that the wire sections running on the top side of the wire guide rolls ("upper wire strands") run parallel and form a regular web 11 having constant distances between adjacent wire sections. A workpiece 15 is adhesively bonded to a sawing strip 16 by means of an adhesive 17. The sawing strip 16 represents a feed device, by means of which the workpiece is moved perpendicularly to the web 11 along arrow 18 and is brought into engagement therewith. Furthermore, the apparatus comprises left nozzle combs 19 and right nozzle combs 20 for supplying abrasive (slurry) in the form of a left elongate jet 22 and a right elongate jet 23 onto the left wire guide roll 3 and the right wire guide roll 4 and thus onto the web 11.

The wire guide rolls are mounted rotatably about axes 5 and 6. Their axes and the axis 14 of the workpiece 15—a cylindrical rod in the example shown—are oriented parallel to one another and run through the corners of an isosceles triangle, the base of which connects the axes of the wire guide rolls. In order to initiate the slicing process, one wire guide roll, for example the left wire guide roll 3, is driven to rotation 7 ("Master"). The other wire guide roll ("Slave"), in the example the right wire guide roll 4, concomitantly rotates, in a manner pulled by wire 1, in the same sense in the rotation direction 8. In the example shown in FIG. 1, the wire 1 is supplied from the left in the arrow direction 9, runs in multiple alternation over the upper web 11 and in the opposite direction over a resulting lower web 12 multiply via the wire guide rolls and then finally runs out from the apparatus toward the right in the arrow direction 10. The workpiece 15 is moved perpendicularly in the direction 18 through the web 11 by means of a feed device, which is represented by the sawing strip 16 in the illustration.

As soon as the underside of the workpiece 15 comes into contact with the web 11, a force builds up between web 11 and the workpiece 15 in the feed direction (=wire transverse direction; wire transverse tension). By means of the relative movement of the wire sections running in the same sense in the web 11 with respect to the workpiece, the lapping agent sprayed onto the wire web and entrained by the wire sections, and the wire transverse tension, material removal from the workpiece (and the sawing wire) is brought about, and sawing gaps 13 form in which the web 11 works through the workpiece 15 upon further feeding in the arrow direction 18.

In the pilgrim step sawing method, the direction of the wire longitudinal movement 9, 10 is reversed multiply during a complete cut through the workpiece 15, wherein, in each individual one of these pairs—called "pilgrim step"—of direction reversals, the wire is moved by a longer length in one direction and a shorter length in the opposite direction. As a result, overall in each complete pilgrim step a wire length corresponding to the sum of both lengths runs through the slicing gaps; however, that length of the engaged wire section by which the entire wire supply has thus shifted after one completely performed pilgrim step from the take-off toward the take-up spool corresponds only to the difference between these two lengths.

FIG. 2 shows essential elements of the apparatus in accordance with FIG. 1 in side view, to be precise at the instant at which the wire 1 or the wire sections of the web 11 move from left to right in the arrow direction 9. The jet 22 sprayed onto the web from the left nozzle combs 19 and residues of the jet 23 sprayed from the right nozzle combs 20 and still adhering to the wire are for the most part stripped away by the surface of the workpiece when the wire enters into the workpiece. A wire-entry-side zone 26 forms, in which the abrasive accumulates, and only a small quantity of abrasive still remaining on the wire is introduced from the wire into the sawing gap in order to bring about material removal there.

Over the length L of the sawing gap 13, from wire entry to wire exit from the workpiece, as a result of displacement, dripping away and grain fracture, as measured from the location of the wire entry, a progressive depletion of the abrasive S occurs, as is illustrated schematically by curve 24 in the diagram S=S(L) in FIG. 2. The depletion of the abrasive, the total quantity of the chipping work carried out over the wire engagement length in the gap on the workpiece and the total quantity of shear work carried out over the wire engagement length during the movement of the wire against the viscous abrasive lead to a temperature that increases from wire entry to wire exit in the sawing gap in the wire longitudinal direction. This is shown schematically by curve 25 in the diagram T=T(L) in FIG. 2.

FIG. 3 differs from FIG. 2 in particular in that the wire running direction, represented by arrow 26, is reversed and runs from right to left. Curve 27 schematically shows the distribution S=S(L) of abrasive over the wire engagement length L and curve 28 shows the profile T=T(L) of the temperature over the wire engagement length L, as measured from the location of wire entrance into the workpiece to the location of wire emergence from the workpiece.

FIG. 4 shows that the distribution S=S(L) of the abrasive and the profile T=T(L) of the temperature also change with the length of wire engagement. If the workpiece has the cylindrical form shown, for example, the wire engagement length L changes in a manner dependent on the path length of the feeding of the workpiece. FIG. 4 shows the instant of sawing into the workpiece, at which the length of wire engagement L is particularly short. Accordingly, the distribution 37 of the abrasive and the profile 38 of the temperature over the short wire engagement length L are comparatively low. At the instant of engagement (the beginning of cut), however, the change in the quantity of abrasive and the change in the temperature are considerable.

FIG. 5 shows the distribution S=S(L) of the abrasive and of the coolant and the profile T=T(L) of the temperature over the wire engagement length L when carrying out the method according to the invention. The apparatus according to the invention comprises, in addition to the apparatus shown in FIG. 1, a left nozzle 29 and a right nozzle 32. These nozzles are arranged below the wire web 11. The distance between the nozzles is dimensioned such that the workpiece 15 has enough space between the nozzles when working through the wire web.

The nozzles 29 and 32 respectively form an elongate, for example cylindrical, comb whose axis 41 and 42, respectively, is parallel to the axis 14 of the workpiece 15. The comb consists of a multiplicity of punctiform individual nozzles or is embodied as an elongate nozzle slot. The length of the nozzles 29 and 32 and the axial arrangement thereof relative to the web 11 are such that the web is sprayed over its entire width.

In the example of the method according to the invention as shown in FIG. 5, the wire 1 and thus all the wire sections in the web 11 move from the left, the abrasive supply being stripped away upon wire entry into the workpiece in the zone 26 and being accumulated. The abrasive is sprayed onto the web from above by the nozzle 19. In this phase, only the nozzle 32 is switched on below the web 11. The nozzle 32 is that nozzle below the web which is situated opposite the entry side of the wire sections and sprays the coolant with a jet 30 from the side and from below into the slicing gaps 13 in the workpiece 15.

Since the slicing gaps are narrow and become very deep with increasing progression of cutting, the coolant sprayed in penetrates into the slicing gaps only to a certain depth and thus only in a certain region 31. As a result of the coolant being sprayed from the side and from below into the slicing gaps, the region 31 acquires a particularly large area and the cooling effect of the jet 30 of coolant becomes particularly effective. The distance 43 between the nozzle 32 and the web 11, the distance 44 between the nozzle 32 and the surface of the workpiece 15 and the width 45 and angular orientation 46 of the jet 30 of coolant are preferably set such that a temperature-regulated region 31 arises in the slicing gaps, which leads to a profile T=T(L) of the temperature over the wire engagement length L with the greatest possible uniformity 40.

The coolant is preferably a slurry of cutting-active hard substances in an aqueous or oil-containing or glycol-containing carrier liquid. Particularly preferably, the coolant used is a slurry having the same composition as the abrasive sprayed onto the wire web from above.

If such a slurry having the same composition is used, the spraying of the coolant also has the effect that the side depleted of abrasive receives additional abrasive. This then results in a distribution S=S(L) of abrasive and coolant over the wire engagement length L which corresponds to the curve 39 and is particularly uniform.

The left nozzle 29 and the right nozzle 32 are preferably arranged such that their axes 41 and 42 and the axis 14 of the workpiece 15 form the corners of an isosceles triangle, in which the axes 41 and 42 form the base and wherein said base runs parallel to the wire sections of the wire web 11.

In the example shown in FIG. 5, only the nozzle 19 on the entry side of the sawing wire 1 into the workpiece sprays abrasive 22 onto the web 11. The nozzle 20 on the opposite side remains switched off at this point in time. Owing to the current wire movement in the arrow direction 9 from left to right, abrasive sprayed by the nozzle 20 would be transported away from the workpiece by the movement of the wire sections and would not manifest a slicing effect in the slicing gap. Alternate spraying only from that nozzle 19 or 20 which respectively lies on the side of the current wire entry into the workpiece is advantageous since it saves abrasive.

FIG. 6 shows, complimentarily to FIG. 5, the situation if the wire sections move from right to left in the arrow direction 26. Now only the nozzle 29 situated opposite the entry side of the wire sections is switched on below the web 11. Through said nozzle, coolant is sprayed with a jet 33 into the slicing gaps 13 of the workpiece 15. Depending on the distance between the nozzle 29 and the web 11, the distance between the nozzle 29 and the surface of the workpiece 15, the width and the angular orientation of the jet 33 and the volumetric flow rate of the jet 33 of coolant, a particularly effectively temperature-regulated region 34 arises in the slicing gaps 13. Therefore, also in the case of a direction of the movement of the wire sections that is directed oppositely by comparison with FIG. 5, this results in a temperature profile T=T(L) over the wire engagement length L which corresponds to the curve 36 and is particularly uniform. If a coolant is used whose composition corresponds to that of the abrasive used, the distribution S=S(L) of abrasive and coolant over the wire engagement length L, which corresponds to the curve 35, is likewise very uniform.

The method according to the invention preferably comprises single-wire multiple slicing lapping carried out according to the pilgrim step method, and a pilgrim step in the method according to the invention preferably consists of a sequence of the steps illustrated in FIG. 5 and FIG. 6:

In the first partial step, the sawing wire runs from left to right in the arrow direction 9. In this case, a jet 22 of abrasive is sprayed onto the web 11. At the same time, the right nozzle 32 arranged below the web 11 and situated opposite the entry side of the wire sections is switched on and sprays a jet 30 of coolant into the region 31 of the slicing gaps 13. The nozzle 20 arranged above the wire web and the nozzle 29 arranged below the web are switched off in the meantime. As an alternative to this, the nozzle 20 arranged above the wire web can also be switched on.

In the second partial step, the sawing wire runs from right to left. In this case, a jet 23 of abrasive is sprayed onto the web 11. At the same time, the left nozzle 29 arranged below the web 11 and situated opposite the entry side of the wire sections is switched on and sprays a jet 33 of coolant into the region 34 of the slicing gaps 13. The nozzle 19 arranged above the wire web and the nozzle 32 arranged below the web are switched off in the meantime. As an alternative to this, the nozzle 19 arranged above the wire web can also be switched on.

The optimum distances between the nozzles 29 and respectively 32 and the web 11, the optimum distances between the nozzles 29 and respectively 32 and the surface of the workpiece, the optimum width and angular orientation of the jet 30 and respectively 33 and the optimum volumetric flow rate of coolant sprayed through the nozzles 29 and respectively 32 are determined, for example, by test cuts with in each case varied arrangements with assessment of the resulting temperature distribution by means of a thermal imaging camera and the resultant distribution of abrasive and coolant by means of measuring the wedge configuration of the slices obtained in the wire longitudinal direction. Such an optimization is to be performed individually for a type of saw, since the number, size and distance of the wire guide rolls (web length), the type and arrangement of the nozzles 19 and 20 and also the thermal conditions of the surrounding machine housing are different depending on the design series and, consequently, have a different effect on optimum cooling and distribution of abrasive and coolant. The optimization can also accompany production, that is to say be effected without any loss of yield through test cuts.

What is claimed is:

1. A method for simultaneously slicing a multiplicity of slices from a workpiece, the method comprising:
   holding the workpiece with a feed device so as to position an axis of the workpiece parallel to axes of wire guide rolls of a wire saw;
   moving the workpiece, using the feed device, perpendicularly from above through a web of the wire saw, the web being formed from a multiplicity of wire sections running parallel to one another and in one plane;
   rotating the wire guide rolls while alternately changing the direction of rotation, so that the relative movement guides the wire sections from an entry side to an exit side through the workpiece, the entry side and exit side alternating with the change in direction of rotation;
   supplying a slurry of hard substances in a carrier liquid as abrasive to the wire sections while the wire sections undergo the relative movement; and
   spraying a coolant from the side and from below into slicing gaps that arise during the relative movement of the workpiece through the web,
   wherein the coolant is sprayed through nozzles arranged below the web and parallel to the axes of the wire guide rolls, and
   wherein the coolant is sprayed into the slicing gaps alternating with the change of direction of rotation only through a nozzle situated opposite the entry side of the respective wire section.

2. A method for simultaneously slicing a multiplicity of slices from a workpiece, the method comprising:
   holding the workpiece with a feed device so as to position an axis of the workpiece parallel to axes of wire guide rolls of a wire saw;
   moving the workpiece, using the feed device, perpendicularly from above through a web of the wire saw, the web being formed from a multiplicity of wire sections running parallel to one another and in one plane;
   rotating the wire guide rolls while alternately changing the direction of rotation, so that the relative movement guides the wire sections from an entry side to an exit side through the workpiece, the entry side and exit side alternating with the change in direction of rotation;
   supplying a slurry of hard substances in a carrier liquid as abrasive to the wire sections while the wire sections undergo the relative movement; and
   spraying a coolant from the side and from below into slicing gaps that arise during the relative movement of the workpiece through the web,
   wherein the coolant is sprayed through nozzles arranged below the web and parallel to the axes of the wire guide rolls,
   wherein the coolant is sprayed into the slicing gaps alternating with the change of direction of rotation only through a nozzle situated opposite the entry side of the respective wire section, and
   wherein a further slurry of hard substances in a carrier liquid is used as the coolant.

3. The method as recited in claim 2, wherein the abrasive used and the coolant used have identical properties with the exception of the temperature.

4. The method as recited in claim 1, wherein the abrasive used and the coolant used have the same temperature.

5. The method as recited in claim 1, wherein the abrasive used and the coolant used have different temperatures.

6. The method as recited in claim 1, wherein the temperature of the coolant is altered during the movement of the workpiece through the web.

7. The method as recited in claim 6, wherein the temperature of the coolant is altered in a manner dependent on an engagement length of the wire sections in the workpiece.

8. The method as recited in claim 7, wherein the temperature of the coolant is increased as the wire engagement length increases, and the temperature of the coolant is reduced as the wire engagement length decreases.

9. The method as recited in claim 1, wherein a volumetric flow rate of the sprayed coolant is kept constant during the movement of the wire sections through the web.

10. The method as recited in claim 1, wherein a volumetric flow rate of the sprayed coolant is altered during the movement of the wire sections through the web.

11. The method as recited in claim 10, wherein the volumetric flow rate of the coolant sprayed in is altered in a manner dependent on the wire engagement length in the workpiece.

12. The method as recited in claim 11, wherein the volumetric flow rate of the coolant sprayed in is increased as the wire engagement length increases, and is reduced as the wire engagement length decreases.

13. The method as recited in claim 1, wherein the workpiece is a single crystal having a diameter of at least 450 mm.

* * * * *